July 4, 1944.  M. A. EDWARDS  2,352,620
ELECTRICAL SYSTEM
Filed Oct. 17, 1942
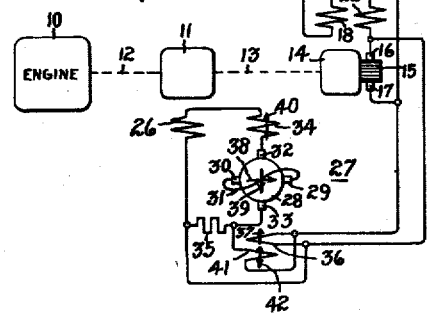
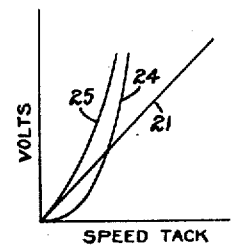
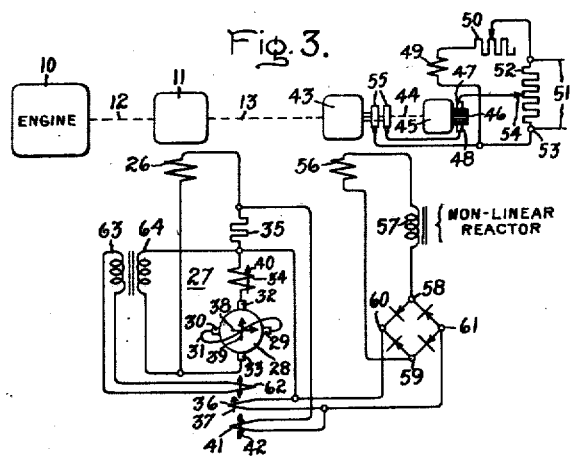
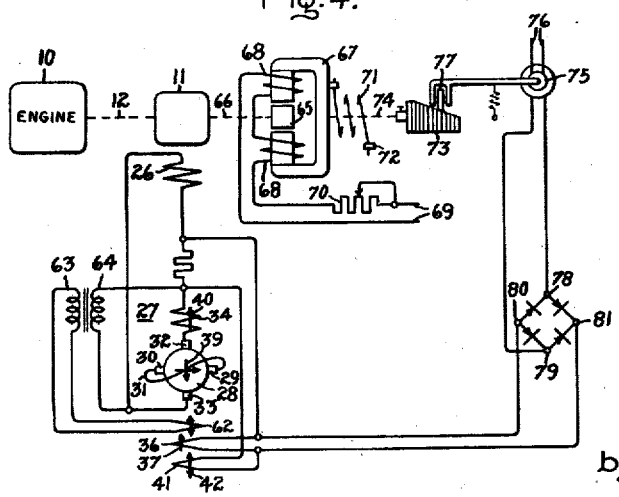
Inventor:
Martin A. Edwards,
by Harry E. Dunham
His Attorney.

Patented July 4, 1944

2,352,620

UNITED STATES PATENT OFFICE 2,352,620

ELECTRICAL SYSTEM

Martin A. Edwards, Scotia, N. Y., assignor to General Electric Company, a corporation of New York Application October 17, 1942, Serial No. 462,393

18 Claims. (Cl. 171—223)

My invention relates to electrical systems and more particularly to dynamometer control systems used in testing various types of prime movers.

An object of my invention is to provide an improved electrical system for controlling dynamo-electric machines.

Another object of my invention is to provide an improved electrical system for the control of prime mover testing generators such as dynamometers.

Further objects and advantages of my invention will become apparent and my invention will be better understood from the following description referring to the accompanying drawing, and the features of novelty which characterize my invention will be pointed out with particularity in the claims annexed to and forming part of this specification.

In the drawing, Fig. 1 schematically illustrates an electrical system embodying my invention for the control of a dynamometer used in testing an internal combustion engine; Fig. 2 illustrates the characteristics of the auxiliary exciter shown in Fig. 1; Fig. 3 schematically illustrates another electrical system embodying my invention; and Fig. 4 schematically illustrates a further embodiment of my invention applied to an engine testing system.

Referring to the drawing, I have shown a prime mover 10, such as an internal combustion engine, arranged to drive the rotatable member 11 of a main-dynamo-electric machine, such as an inductor type eddy current generator, arranged as a dynamometer for testing the engine. The rotatable member 11 is adapted to be driven by the prime mover 10 by a shaft 12 and is also connected by a suitable connection, such as a shaft 13, to the rotatable member or armature 14 of an auxiliary direct current exciter generator. This exciter armature 14 is provided with a winding connected to a commutator 15 with which brushes 16 and 17 form an electrical contact. Excitation is provided to the armature 14 by a field exciting winding 18 which is energized from a suitable source of electrical power supply 19 and is adapted to be controlled by a variable resistance 20. The excitation provided by the field exciting winding 18 to the exciter is such that the machine normally would operate as a magnetically unsaturated machine, and the terminal voltage across the brushes 16 and 17 of the armature 14 would be substantially proportional to the speed of the armature 14 due to the excitation provided by this winding, as represented by curve 21 in Fig. 3. For testing certain types of prime movers, it is desirable that the excitation provided by this auxiliary exciter should not have a linear characteristic, as represented by the curve 21, but would bear some other non-linear characteristic relative to the speed of the prime mover. In order to obtain such a characteristic, a field exciting winding 22 is arranged to provide a component of excitation to the auxiliary exciter which is cumulative to the excitation provided by the field exciting winding 18. This field exciting winding 22 is connected in shunt across the brushes 16 and 17 of the auxiliary exciter through a variable resistance 23. The energization of the field exciting winding 22, therefore, is responsive to the speed of the auxiliary exciter armature 14, and the voltage induced by the excitation of the field exciting winding 22, therefore, varies substantially as the square of the speed of the auxiliary exciter armature 14, as represented by the curve 24 in Fig. 2. The resultant voltage of the auxiliary exciter may be represented by the curve 25 in Fig. 2. This voltage speed characteristic of the auxiliary exciter can be varied by varying the resistances 20 and 23 to provide various forms of excitation dependent upon any predetermined desired characteristic of the main dynamometer.

The auxiliary exciter of the type shown in this figure may not be sufficiently sensitive and may have too slow a speed of response to provide the desired control for the main dynamometer. In order to increase these two equalities of the system, the main generator is provided with a field exciting winding 26 which is arranged to be energized by a main exciter 27 of the armature reaction excited type. This main exciter 27 is provided with a rotatable member or armature 28 having a winding connected to a commutator and is provided with a set of primary brushes 29 and 30 electrically connected together externally of the armature circuit by a short-circuiting conductor 31 to complete a primary circuit through the armature 28. A set of secondary brushes 32 and 33 is electrically displaced from the primary brushes 29 and 30 about the commutator of the armature 28 to provide a secondary circuit through the armature. These brushes 32 and 33 are connected to the dynamometer field exciting winding 26 through a compensating field exciting winding 35 and a potentiometer or series resistance 35. The main component of excitation is provided to the main exciter 27 by a field exciting winding 36 which is connected to the brushes 16 and 17 of the auxiliary exciter armature 14. The energizing voltage of this control field exciting winding 36, therefore, may be non-linearly responsive to the speed of the dynamometer and the prime mover and may be varied to produce the desired dynamometer operating characteristic. This control field exciting winding is adapted to provide a component of excitation along the secondary brush commutating axis of the main exciter 27, as indicated by the arrow 37, which will induce a voltage between the exciter primary brushes 29 and 30 and produce a primary short-circuit current through the primary circuit of the armature 28. This short-circuit current will produce a primary armature reaction, as indicated by the arrow 38, which in turn will be cut by the conductors of the winding on the armature 28 and will induce a voltage between the secondary brushes 32 and 33 which will energize the dynamometer field exciting winding 26. When the current flows through the secondary circuit of the armature 28, a secondary component of armature reaction will be produced, as indicated by the arrow 39, which is opposed to the control component of excitation 37. In order to minimize the component of excitation required of the control field exciting winding 36, the compensating field exciting winding 34 is constructed and arranged to provide a component of excitation, as indicated by the arrow 40, substantially equal and opposite to the component of armature reaction due to the flow of current through the secondary armature circuit. The speed of response of the main exciter 27 is further increased by arranging a field exciting winding 41 adapted to provide a component of excitation cumulative to the excitation 37 of the control field exciting winding 36, as indicated by the arrow 42, also along the secondary brush commutating axis. This winding 41 is connected across the resistance 35 and the energizing voltage of the control field exciting winding 36 such that this field exciting winding normally is deenergized. This is obtained by making the resistance 35 such that the voltage drop thereacross is substantially equal to the voltage across the control field exciting winding 36, and the field exciting winding 41 is connected across these voltages in opposition to each other so that substantially no voltage normally exists across the field exciting winding 41. However, when a change takes place in the energizing voltage of the field exciting winding 36, a change will occur in the current flowing through the secondary brushes and consequently through the resistance 35. The resistance 35 is made such that the voltage drop thereacross due to the change in secondary current therethrough is substantially less than the change in the voltage impressed across the field exciting winding 36, such that an energizing current flows through the field exciting winding 41 and provides a component of energization 42 along the secondary brush commutating axis of the exciter 27, cumulative or opposed to the component 37 of excitation of the field exciting winding 36 if the energizing voltage of the winding 36 rises or falls, respectively. This causes a further change in the secondary current of the exciter 27 which results in a further corresponding change in the voltage drop across the resistance 35 until the drop across this resistance is substantially equal and opposite to the voltage across the field exciting winding 36. When this occurs, the field exciting winding 41 again is deenergized. Thus, the field exciting winding 41 is energized only when the current in the exciter secondary brushes is other than a predetermined value relative to the energizing voltage of the control field exciting winding 36 and thereby maintains a predetermined relationship therebetween between the energization of the dynamometer field exciting winding 26 and the energization of the exciter control field exciting winding 36 and produces a more rapid change in the energizing current of the dynamometer field exciting winding 26 than would be obtained without this field exciting winding 41.

In Fig. 2 I have shown another embodiment of my invention wherein an electrical system is arranged to test a prime mover 10, such as an internal combustion engine, arranged to drive the rotatable member 11 of a main dynamoelectric machine arranged as a dynamometer for testing the engine. The rotatable member 11 is adapted to be driven by the prime mover 10 by a coupling or shaft 12 and is also connected by a suitable connection, such as a shaft 13, to the rotatable field member 43 of an alternator arranged as a source of auxiliary excitation for the dynamometer exciter control system. The rotatable member 43 is connected by a suitable coupling or shaft 44 to the rotatable member or armature 45 of an auxiliary direct current exciter provided with an armature winding connected to a commutator 46 having contact brushes 47 and 48.

As in the arrangement of Fig. 1, this system is adapted to provide a non-linear torque-speed characteristic to the dynamometer by providing a corresponding excitation thereto. This is obtained by the arrangement and connection of the excitation control system for the machine. Excitation is provided to the auxiliary direct current exciter by a field exciting winding 49 which is connected in series with a variable resistor 50 arranged to control the energization thereof and across a substantially constant voltage source of direct current electrical power supply 51. Since the alternator rotatable member 43 and the auxiliary exciter armature 45 are arranged to be driven at speeds responsive to the speed of the dynamometer 11, the voltage induced in the auxiliary exciter armature between the brushes 47 and 48 is substantially proportional to the speed of the dynamometer 11 and the engine 10. A potentiometer 52 is connected across the source of electrical power supply 51 and the auxiliary exciter armature is connected in series with a portion of the potentiometer between the terminals 53 and 54 thereof and across slip rings 55 connected to the rotatable field member 43 of the armature. In this manner, the excitation of the alternator may be varied to suit the type prime mover which is to be tested and the voltage of the auxiliary exciter 45 may be made to add to the voltage of the source of electrical power supply 51 or may be connected differentially relative thereto. In either case, the energization of the exciting member 43 of the alternator will be responsive to the speed of the dynamometer 11. The alternator is provided with an armature winding 56 in which a voltage is induced proportional to the excitation and speed of the rotatable exciting member 43 and, since this excitation is proportional to the alternator speed, the voltage induced in this armature winding is substantially equal to the square of the speed of the alternator and, therefore, of the speed of the dynamometer 11. A non-linear reactor 57 is connected in series with the alternator armature winding 56 and this circuit is connected across the terminals 58 and 59 of a full-wave rectifier. This non-linear reactor is a substantially constant flux device with varying frequency, such that it is necessary for the voltage of the alternator winding 56 to rise faster than the change in speed of the alternator in order to obtain a change in flux in the reactor or a change in current through the full-wave rectifier. This is obtainable by the non-linear voltage which is geneerated in the winding 56 proportional to the square of the speed of the machine.

An auxiliary exciter of the type shown in this figure may not be sufficiently sensitive and may have too slow a speed of response to provide the desired control for the main dynamometer. In order to increase these two characteristics of the system, the main generator or dynamometer is provided with a field exciting winding 26 which is arranged to be energized by a main exciter 27 of the armature reaction excited type, such as an amplidyne generator. This main exciter 27 is provided with a rotatable member or armature 28 and field exciting windings 36 and 41 corresponding to these elements described above with reference to Fig. 1. In this arrangement, the field exciting winding 36 is connected across the terminals 60 and 61 of the full-wave rectifier connected across the alternator armature 56 as a non-linear voltage source of electrical power supply. The operation of this exciter is essentially the same as that described above with reference to Fig. 1. In the arrangement illustrated, one additional field exciting winding 62 is arranged on the exciter and is connected across the secondary winding 63 of a transformer having a primary winding 64 connected across the amplidyne exciter armature 28 and the exciter compensating field exciting winding 34. Under steady state conditions, no voltage is induced in the secondary winding 63 of the transformer, and therefore, the field exciting winding 62 is normally deenergized. Under transient conditions, voltage is induced in the secondary winding 63 of the transformer and the field exciting winding 62 is energized so as to provide a component of excitation along the secondary brush commutating axis of the main exciter 27 to induce a voltage between the primary brushes 29 and 30 which is substantially equal and opposite to the transient disturbance which caused the energization of the field exciting winding 62. This field exciting winding arrangement tends to stabilize the action of the exciter 27. As in the arrangement described with reference to Fig. 1, this excitation system provides for the more rapid response of the dynamometer to a desired characteristic for testing the engine 10.

Another embodiment of my invention is shown in Fig. 4 wherein a prime mover 10 is arranged to drive the rotatable member 11 of a main dynamoelectric machine arranged as a dynamometer for testing the engine 10. The excitation control arrangement of this system is adapted to provide substantially the same general results as those of Figs. 1 and 2. The rotatable member 11 is driven by the engine 10 through a shaft 12 and is adapted to drive a rotatable member 65 of an induction clutch through a suitable connection such as a shaft or a coupling 66. This induction clutch is provided with a concentrically rotatably mounted element 67 which is adapted to be excited by exciting windings 68 which are energized from a suitable source 69 of direct current electrical power supply, connected in series with a variable resistance 70 for controlling the energization of the exciting winding 68. The rotatably mounted clutch member 67 is arranged to be restrained by a resilient spring 71 secured to the member 67 and to a stationary support 72. The spring 71 has a linear resistance displacement characteristic such that the rotational displacement of the clutch member 67 is proportional to the torque thereon and is, therefore, proportional to the speed of the rotatable member 11 of the dynamometer. A cam 73 is mounted on a shaft 74 connected to the rotatably supported clutch member 67, and this cam is formed with a non-linear cam surface corresponding to a desired operating characteristic of the dynamometer 11. A voltage regulator 75 is connected to an alternating current source of electrical power supply 76 and is adapted to be controlled by a cam follower 77 which is arranged to engage the non-linear cam surface of the cam 73 such that the displacement of the cam follower 77 and, therefore, the output voltage of the voltage regulator 75 is responsive to the characteristic represented by the cam 73 and to the displacement of the clutch member 67 and, therefore, to the speed of the rotatable member 11 of the dynamometer. This response of the voltage regulator, however, is a non-linear function of the speed of the rotatable member 11 as the surface of the cam 73 corresponds to a non-linear characteristic of the dynamometer. The output terminals of the voltage regulator 75 are connected to terminals 78 and 79 of a full-wave rectifier. As in the arrangement shown in Figs. 1 and 2, the output of the full-wave rectifier might not be sufficiently sensitive and might have too slow a speed of response to provide the desired control of the main dynamometer. These characteristics are improved by providing a main exciter 27 similar to the main exciters of the systems shown in Figs. 1 and 2. In this construction, the dynamometer is provided with a field exciting winding 26 energized by the armature 28 of the main exciter 27 and is controlled by a main field exciting winding 36 connected to the output terminals 80 and 81 of the full-wave rectifier. This main exciter also is provided with a compensating field exciting winding 34, an auxiliary control field exciting winding 41 and a stabilizing field exciting winding 62 connected in the same manner as those of the main exciter shown in Fig. 3. The operation of the main exciter 27 is substantially the same as that described above with respect to Figs. 1 and 2 and provides a more rapid increase in the energizing current of the dynamometer field exciting winding 26 than would be obtained if this field exciting winding were to be connected directly to the output terminals 80 and 81 of the full-wave rectifier.

While I have illustrated and described particular embodiments of my invention, modifications thereof will occur to those skilled in the art. I desire it to be understood, therefore, that my invention is not to be limited to the particular arrangements and connections disclosed, and I intend in the appended claims to cover all modifications which do not depart from the spirit and scope of my invention.

What I claim as new and desire to secure by Letters Patent of the United States is:

1. An electrical system including a main dynamo-electric machine having a field exciting winding, an exciter arranged to energize said main dynamo-electric machine field exciting winding, means including a field exciting winding for providing a component of excitation to said exciter, means for providing to said exciter field exciting winding an energizing voltage responsive to the speed of said main dynamo-electric machine, means including a second field exciting winding for providing a component of excitation to said exciter along the same axis as said exciter first-mentioned field exciting winding, and means for energizing said second field exciting winding only when the energizing current supplied by said exciter to said dynamo-electric machine field exciting winding varies from a predetermined value relative to said first-mentioned exciter field exciting winding energizing voltage.

2. An electrical system including a main dynamo-electric machine having a field exciting winding, an exciter arranged to energize said main dynamo-electric machine field exciting winding, means including a field exciting winding for providing a component of excitation to said exciter, means for providing to said exciter field exciting winding an energizing voltage non-linearly responsive to the speed of said main dynamo-electric machine, means including a second field exciting winding for providing a component of excitation to said exciter along the same axis as said exciter first-mentioned field exciting winding, and means for energizing said second field exciting winding only when the energizing current supplied by said exciter to said dynamo-electric machine field exciting winding varies from a predetermined value relative to said first-mentioned exciter field exciting winding energizing voltage for maintaining a predetermined relationship therebetween.

3. An electrical system including a main dynamo electric machine having a field exciting winding, an exciter arranged to energize said main dynamo-electric machine field exciting winding, means including a field exciting winding for providing a component of excitation to said exciter, means for providing to said exciter field exciting winding an energizing voltage dependent on a predetermined desired characteristic of said main dynamo-electric machine and responsive to the speed of said main dynamo-electric machine, means including a second field exciting winding for providing a component of excitation to said exciter along the same axis as said exciter first-mentioned field exciting winding, and means for energizing said second field exciting winding dependent on a predetermined relationship of the energizing current supplied by said exciter to said dynamo-electric machine field exciting winding to said first-mentioned exciter field exciting winding energizing voltage for maintaining a predetermined relationship therebetween.

4. An electrical system including a main dynamo-electric machine having a field exciting winding, an exciter arranged to energize said main dynamo-electric machine field exciting winding, means including a field exciting winding for providing a component of excitation to said exciter, means for providing to said exciter field exciting winding an energizing voltage responsive to the speed of said main dynamo-electric machine, means including a second field exciting winding for providing a component of excitation to said exciter along the same axis as said exciter first-mentioned field exciting winding, and means for energizing said second field exciting winding dependent on a predetermined relationship of the energizing current supplied by said exciter to said dynamo-electric machine field exciting winding to said first-mentioned exciter field exciting winding energizing voltage for maintaining a predetermined relationship therebetween.

5. An electrical system including a main dynamo-electric machine having a field exciting winding, an exciter having an armature provided with a winding and a commutator connected thereto, a set of primary brushes and a set of secondary brushes electrically displaced about said commutator from said primary brushes for providing a primary circuit and a secondary circuit respectively through said armature, means for electrically connecting together said primary brushes to complete said primary circuit, means for connecting said secondary brushes to said main dynamo-electric machine field exciting winding, means including a main field exciting winding for said exciter for providing a component of excitation thereto along the secondary brush commutating axis thereof, voltage means responsive to the speed of said main dynamo-electric machine for energizing said exciter main field exciting winding, and means including a second field exciting winding for providing a component of excitation along the secondary brush commutating axis of said exciter responsive to a predetermined relationship between the secondary brush current of said exciter and said main field exciting winding energizing voltage.

6. An electrical system including a main dynamo-electric machine having a field exciting winding, a main exciter arranged to energize said main dynamo-electric machine field exciting winding, means including a field exciting winding for providing a component of excitation to said main exciter, means for providing to said main exciter field exciting winding an energizing voltage non-linearly responsive to the speed of said main dynamo-electric machine, said last-mentioned means including an auxiliary exciter having a field exciting winding, means for energizing said auxiliary exciter field exciting winding for inducing a component of voltage in said auxiliary exciter substantially dependent on the speed thereof, a second field exciting winding for said auxiliary exciter, means for energizing said second auxiliary exciter field exciting winding, responsive to the voltage of said auxiliary exciter for inducing a non-linear voltage in said auxiliary exciter, means including a second field exciting winding for providing a component of excitation to said main exciter along the same axis as said exciter first-mentioned field exciting winding, and means for energizing said main exciter second field exciting winding dependent on a predetermined relationship of the current of said main exciter brushes to said main exciter first-mentioned field exciting winding energizing voltage for maintaining a predetermined relationship therebetween.

7. An electrical system including a main dynamo-electric machine having a field exciting winding, a main exciter arranged to energize said main dynamo-electric machine field exciting winding, means including a field exciting winding for providing a component of excitation to said exciter, means for providing to said main exciter field exciting winding an energizing voltage non-linearly responsive to the speed of said main dynamo-electric machine, said last-mentioned means including an alternator and an auxiliary exciter driven at a speed responsive to the speed of said main dynamo-electric machine, means including a field exciting winding for exciting said auxiliary exciter for inducing a voltage therein substantially responsive to the speed thereof, a substantially constant voltage source of electrical power supply, means for exciting said alternator, means for connecting said auxiliary exciter and said source of electrical power supply in series across said alternator exciting means for providing a non-linear excitation to said auxiliary exciter, a non-linear reactor, a full-wave rectifier, means for connecting said non-linear reactor and said full-wave rectifier in series across the output voltage of said alternator, means for connecting the output terminal of said full-wave rectifier across said main exciter field exciting winding, means including a second field exciting winding for providing a component of excitation to said main exciter along the same axis as said main exciter first-mentioned field exciting winding, and means for energizing said main exciter second field exciting winding dependent on a predetermined relationship of the current of said main exciter secondary brushes to said main exciter first-mentioned field exciting winding energizing voltage for maintaining a predetermined relationship therebetween.

8. An electrical system including a main dynamo-electric machine having a field exciting winding, an exciter arranged to energize said main dynamo-electric machine field exciting winding, means including a field exciting winding for providing a component of excitation to said exciter, means for providing to said exciter field exciting winding an energizing voltage non-linearly responsive to the speed of said main dynamo-electric machine, said last-mentioned means including an inductor clutch having one element driven at a speed responsive to the speed of said prime mover and another element arranged to drive a shaft, means for resisting rotation of said shaft linearly responsive to rotational displacement of said shaft, a cam arranged to be driven by said shaft and having a non-linear contour representing a desired characteristic of said main dynamo-electric machine, a voltage regulator connected to a source of electrical power supply, means for operating said voltage regulator responsive to operation of said cam, means including a second field exciting winding for providing a component of excitation to said exciter along the same axis as said exciter first-mentioned field exciting winding, and means for energizing said second field exciting winding dependent on a predetermined relationship of the current of said exciter secondary brushes to said first-mentioned exciter field exciting winding energizing voltage for maintaining a predetermined relationship therebetween.

9. A prime mover electrical testing system including a main generator driven by said prime mover, a field exciting winding for said main generator, an exciter having an armature provided with a winding and a commutator connected thereto, a set of primary brushes and a set of secondary brushes electrically displaced about said commutator from said primary brushes for providing a primary circuit and a secondary circuit respectively through said armature, means for electrically connecting together said primary brushes to complete said primary circuit, means for connecting said secondary brushes to said main generator field exciting winding, means including a main field exciting winding for said exciter for providing a component of excitation thereto along the secondary brush commutating axis thereof, voltage means dependent on a predetermined desired characteristic of said main generator and responsive to the speed of said main generator for energizing said exciter main field exciting winding, and means including a second field exciting winding for providing a component of excitation along the secondary brush commutating axis of said exciter responsive to a predetermined relationship between the energization of said generator field exciting winding and the energization of said exciter main field exciting winding energizing voltage.

10. A prime mover electrical testing system including a main generator driven by said prime mover, a field exciting winding for said main generator, an exciter having an armature provided with a winding and a commutator connected thereto, a set of primary brushes and a set of secondary brushes electrically displaced about said commutator from said primary brushes for providing a primary circuit and a secondary circuit respectively through said armature, means for electrically connecting together said primary brushes to complete said primary circuit, means for connecting said secondary brushes to said main generator field exciting winding, means including a main field exciting winding for said exciter for providing a component of excitation thereto along the secondary brush commutating axis thereof, voltage means dependent on a predetermined desired characteristic of said main generator and responsive to the speed of said main generator for energizing said exciter main field exciting winding, and means including a second field exciting winding for providing a component of excitation along the secondary brush commutating axis of said exciter responsive to a predetermined relationship between the secondary brush current of said exciter and said exciter main field exciting winding energizing voltage.

11. A prime mover electrical testing system including a main generator driven by said prime mover, a field exciting winding for said main generator, an exciter having an armature provided with a winding and a commutator connected thereto, a set of primary brushes and a set of secondary brushes electrically displaced about said commutator from said primary brushes for providing a primary circuit and a secondary circuit respectively through said armature, means for electrically connecting together said primary brushes to complete said primary circuit, means for connecting said secondary brushes to said main generator field exciting winding, means including a main field exciting winding for said exciter for providing a component of excitation thereto along the secondary brush commutating axis thereof, voltage means non-linearly responsive to the speed of said main generator for energizing said exciter main field exciting winding, and means including a second field exciting winding for providing a component of excitation along the secondary brush commutating axis of said exciter responsive to a predetermined relationship between the secondary brush current of said exciter and said exciter main field exciting winding energizing voltage.

12. A prime mover electrical testing system including a main generator driven by said prime mover, a field exciting winding for said main generator, an exciter having an armature provided with a winding and a commutator connected thereto, a set of primary brushes and a set of secondary brushes electrically displaced about said commutator from said primary brushes for providing a primary circuit and a secondary circuit respectively through said armature, means for electrically connecting together said primary brushes to complete said primary circuit, means for connecting said secondary brushes to said main generator field exciting winding, means including a main field exciting winding for said exciter for providing a component of excitation thereto along the secondary brush commutating axis thereof, voltage means non-linearly responsive to the speed of said main generator for energizing said exciter main field exciting winding, means including a second field exciting winding for providing a component of excitation along the secondary brush commutating axis of said exciter, and means for energizing said second field exciting winding dependent on a predetermined relationship between the secondary brush current of said exciter and said exciter main field exciting winding energizing voltage for maintaining a predetermined relationship therebetween.

13. A prime mover electrical testing system including a main generator driven by said prime mover, a field exciting winding for said main generator, an exciter having an armature provided with a winding and a commutator connected thereto, a set of primary brushes and a set of secondary brushes electrically displaced about said commutator from said primary brushes for providing a primary circuit and a secondary circuit respectively through said armature, means for electrically connecting together said primary brushes to complete said primary circuit, means for connecting said secondary brushes to said main generator field exciting winding, means including a main field exciting winding for said exciter for providing a component of excitation thereto along the secondary brush commutating axis thereof, voltage means responsive to the speed of said main generator for energizing said exciter main field exciting winding, means including a second field exciting winding for providing a component of excitation along the secondary brush commutating axis of said exciter, and means for energizing said second field exciting winding dependent on a predetermined relationship between the secondary brush current of said exciter and said exciter main field exciting winding energizing voltage for maintaining a predetermined relationship therebetween.

14. A prime mover electrical testing system including a main generator driven by said prime mover, a field exciting winding for said main generator, a main exciter having an armature provided with a winding and a commutator connected thereto, a set of primary brushes and a set of secondary brushes electrically displaced about said commutator from said primary brushes for providing a primary circuit and a secondary circuit respectively through said armature, means for electrically connecting together said primary brushes to complete said primary circuit, means for connecting said secondary brushes to said main generator field exciting winding, means including a main field exciting winding for said main exciter for providing a component of excitation thereto along the secondary brush commutating axis thereof, voltage means non-linearly responsive to the speed of said main generator for energizing said main exciter main field exciting winding, said last-mentioned means including an auxiliary exciter having a field exciting winding, means for energizing said auxiliary exciter field exciting winding for inducing a component of voltage in said auxiliary exciter substantially dependent on the speed thereof, a second field exciting winding for said auxiliary exciter, means for energizing said auxiliary exciter second field exciting winding responsive to the voltage of said auxiliary exciter for inducing a non-linear voltage in said auxiliary exciter, and means including a second field exciting winding for providing a component of excitation along the secondary commutating axis of said main exciter responsive to a predetermined relationship between the secondary brush current of said main exciter and said main exciter main field exciting winding energizing voltage for maintaining a predetermined relationship therebetween.

15. A prime mover electrical testing system including a main generator driven by said prime mover, a field exciting winding for said main generator, a main exciter having an armature provided with a winding and a commutator connected thereto, a set of primary brushes and a set of secondary brushes electrically displaced about said commutator from said primary brushes for providing a primary circuit and a secondary circuit respectively through said armature, means for electrically connecting together said primary brushes to complete said primary circuit, means for connecting said secondary brushes to said main generator field exciting winding, means including a main field exciting winding for said main exciter for providing a component of excitation thereto along the secondary brush commutating axis thereof, voltage means non-linearly responsive to the speed of said main generator for energizing said main exciter main field exciting winding, said last-mentioned means including an alternator and an auxiliary exciter driven at a speed responsive to the speed of said dynamo-electric machine, means including a field exciting winding for exciting said auxiliary exciter for inducing a voltage therein substantially responsive to the speed thereof, a substantially constant voltage source of electrical power supply, means for exciting said alternator, means for connecting said auxiliary exciter and said source of electrical power supply in series across said alternator exciting means for providing a non-linear excitation to said auxiliary exciter, a non-linear reactor, a full-wave rectifier, means for connecting said non-linear reactor and said full-wave rectifier in series across the output voltage of said alternator, means for connecting the output terminal of said full-wave rectifier across said main exciter field exciting winding, and means including a second field exciting winding for providing a component of excitation along the secondary commutating axis of said main exciter responsive to a predetermined relationship between the secondary brush current of said main exciter and said main exciter main field exciting winding energizing voltage for maintaining a predetermined relationship therebetween.

16. A prime mover electrical testing system including a main generator driven by said prime mover, a field exciting winding for said main generator, an exciter having an armature provided with a winding and a commutator connected thereto, a set of primary brushes and a set of secondary brushes electrically displaced about said commutator from said primary brushes for providing a primary circuit and a secondary circuit respectively through said armature, means for electrically connecting together said primary brushes to complete said primary circuit, means for connecting said secondary brushes to said main generator field exciting winding, means including a main field exciting winding for said exciter for providing a component of excitation thereto along the secondary brush commutating axis thereof, voltage means non-linearly responsive to the speed of said main generator for energizing said exciter main field exciting winding, said last-mentioned means including an inductor clutch having one element driven at a speed responsive to the speed of said prime mover and another element arranged to drive a shaft, means for resisting rotation of said shaft linearly responsive to rotational displacement of said shaft, a cam arranged to be driven by said shaft and having a non-linear contour representing a desired speed responsive characteristic of said main generator, a voltage regulator arranged to be connected to a source of electrical power supply, means for operating said voltage regulator responsive to operation of said cam, means including a second field exciting winding for providing a component of excitation along the secondary brush commutating axis of said exciter, and means for energizing said second field exciting winding dependent on a predetermined relationship between the secondary brush current of said exciter and said exciter main field exciting winding energizing voltage for maintaining a predetermined relationship therebetween.

17. A dynamo-electric machine of the armature reaction excited type including a rotatable member having a winding and a commutator connected thereto, means including a set of primary brushes and a set of secondary brushes electrically displaced about said commutator from said primary brushes for providing a primary and secondary circuit respectively through said rotatable member winding, means for electrically connecting together said primary brushes externally of said rotatable member winding, means including a field exciting winding responsive to current in said secondary circuit for providing a component of excitation substantially equal and opposite to the component of excitation due to current in said rotatable member secondary circuit, a second field exciting winding arranged to provide a component of excitation along the secondary brush commutating axis of said machine, voltage means for energizing said second field exciting winding, a third field exciting winding arranged to provide a component of excitation along the secondary brush commutating axis of said machine, and means for energizing said third field exciting winding responsive to variations in the current in said secondary circuit for maintaining a predetermined relationship between the current in said secondary circuit and the energizing voltage of said second field exciting winding.

18. A dynamo-electric machine of the armature reaction excited type including a rotatable member having a winding and a commutator connected thereto, means including a set of primary brushes and a set of secondary brushes electrically displaced about said commutator from said primary brushes for providing a primary and a secondary circuit respectively through said rotatable member winding, means for electrically connecting together said primary brushes externally of said rotatable member winding, means including a field exciting winding responsive to current in said secondary circuit for providing a component of excitation equal and opposite to the component of excitation due to current in said rotatable member secondary circuit, a second field exciting winding arranged to provide a component of excitation along the secondary brush commutating axis of said machine, variable voltage means for energizing said second field exciting winding, a third field exciting winding arranged to provide a component of excitation along the secondary brush commutating axis of said machine, and means for energizing said third field exciting winding dependent upon the differences in potential between the energizing voltage of said second field exciting winding and a voltage responsive to the current in said secondary circuit.

MARTIN A. EDWARDS.